(12) United States Patent
Hayashi (10) Patent No.: US 10,434,902 B2
(45) Date of Patent: Oct. 8, 2019

(54) SEAT TRACK

(71) Applicant: SHIROKI CORPORATION, Fujisawa-shi, Kanagawa (JP)

(72) Inventor: Naoki Hayashi, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 113 days.

(21) Appl. No.: 15/699,256

(22) Filed: Sep. 8, 2017

(65) Prior Publication Data

US 2018/0079325 A1 Mar. 22, 2018

(30) Foreign Application Priority Data

Sep. 16, 2016 (JP) .................................. 2016-181663

(51) Int. Cl.
*B60N 2/08* (2006.01)
*B60N 2/07* (2006.01)

(52) U.S. Cl.
CPC ......... *B60N 2/0806* (2013.01); *B60N 2/0705* (2013.01); *B60N 2/0715* (2013.01); *B60N 2/0722* (2013.01); *B60N 2/0727* (2013.01); *B60N 2/0818* (2013.01); *B60N 2/0843* (2013.01)

(58) Field of Classification Search
CPC .. B60N 2/0806; B60N 2/0705; B60N 2/0715; B60N 2/0722; B60N 2/0727; B60N 2/0818; B60N 2/0843
USPC ........................................ 248/424, 429, 430
See application file for complete search history.

(56) References Cited

U.S. PATENT DOCUMENTS

| 7,506,856 | B2* | 3/2009 | Ikegaya | B60N 2/0705 248/419 |
|---|---|---|---|---|
| 7,669,826 | B2* | 3/2010 | Hayakawa | B60N 2/0705 248/429 |
| 7,758,008 | B2* | 7/2010 | Kojima | B60N 2/0818 248/429 |
| 7,815,159 | B2* | 10/2010 | Moriyama | B60N 2/0727 248/430 |
| 8,770,534 | B2* | 7/2014 | Nakamura | B60N 2/0705 248/429 |
| 9,045,060 | B2* | 6/2015 | Zaiki | B60N 2/0705 |
| 9,162,588 | B2* | 10/2015 | Yamada | B60N 2/0722 |
| 9,371,013 | B2* | 6/2016 | Nakamura | B60N 2/0705 |
| 9,701,218 | B2* | 7/2017 | Satoh | B60N 2/0705 |
| 9,764,660 | B2* | 9/2017 | Takiya | B60N 2/075 |
| 9,783,082 | B2* | 10/2017 | Sato | B60N 2/0705 |
| 9,802,511 | B2* | 10/2017 | Matsushima | B60N 2/0705 |
| 9,855,867 | B2* | 1/2018 | Satoh | B60N 2/0837 |

(Continued)

FOREIGN PATENT DOCUMENTS

JP 2010-089689 A 4/2010

*Primary Examiner* — Nkeisha Smith
(74) *Attorney, Agent, or Firm* — Buchanan Ingersoll & Rooney PC (57) ABSTRACT

A seat track includes a stopper. The stopper includes a hole formed in a first rail and a stopper main body that projects in a direction of intersecting with a relative sliding direction of a second rail from an edge portion of the hole and is configured to restrict a move of a retainer. When a distance between centers of two steel balls disposed at both ends in the relative sliding direction of the second rail is L1 among steel balls and a distance between inner walls of the hole in the relative sliding direction of the second rail is L2, L1≥L2.

4 Claims, 7 Drawing Sheets

(56) References Cited

U.S. PATENT DOCUMENTS

| | | | | |
|---|---|---|---|---|
| 9,914,373 B2* | 3/2018 | Sato | ............... | B60N 2/0705 |
| 2008/0048086 A1* | 2/2008 | Kojima | ............... | B60N 2/0705 |
| | | | | 248/429 |
| 2010/0090084 A1* | 4/2010 | Moriyama | ............... | B60N 2/0725 |
| | | | | 248/430 |
| 2018/0009337 A1* | 1/2018 | Kimura | ............... | B60N 2/0715 |
| 2018/0022236 A1* | 1/2018 | Taniguchi | ............... | B60N 2/0705 |
| | | | | 297/344.11 |

* cited by examiner

SEAT TRACK

CROSS-REFERENCE TO RELATED APPLICATION

This application claims priority from Japanese Patent Application No. 2016-181663 filed with the Japan Patent Office on Sep. 16, 2016, the entire content of which is hereby incorporated by reference.

BACKGROUND

1. Technical Field

This disclosure relates to a seat track.

2. Description of the Related Art

Figure 8:
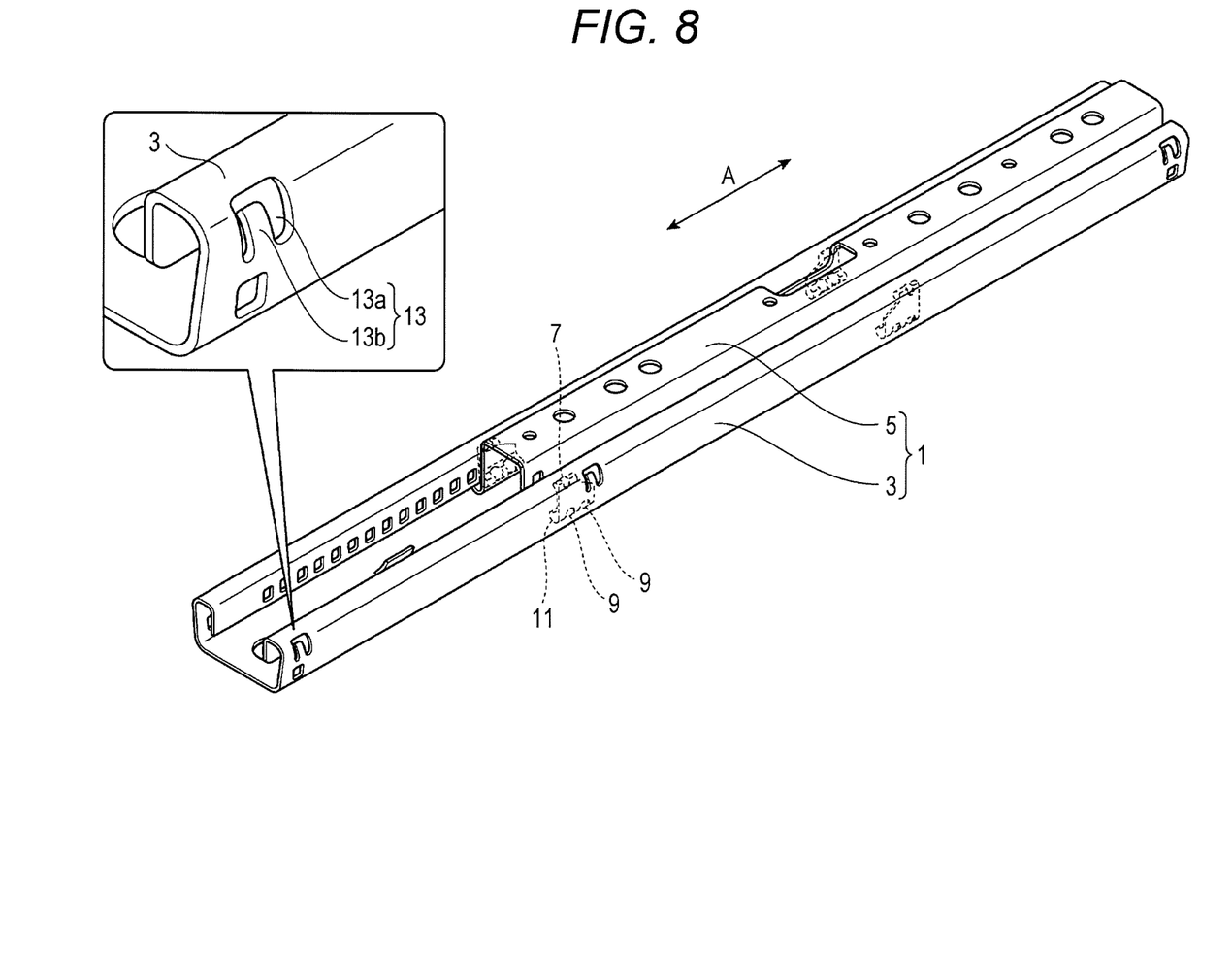
FIG. 8 is a perspective view illustrating a main part of a conventional seat track.

The following describes a conventional seat track with reference to FIG. 8. FIG. 8 is a perspective view illustrating a main part of the conventional seat track. A seat track 1 includes a lower rail 3 disposed on a floor side and an upper rail 5 slidably engaging with the lower rail 3.

Between the lower rail 3 and the upper rail 5, steel balls are disposed. The steel balls movably support the upper rail 5 with respect to the lower rail 3 in an arrow A direction. The steel balls in this conventional example are formed of an upper steel ball 7 and two lower steel balls 9. The lower steel balls 9 are disposed along a sliding direction of the upper rail 5 and positioned in a lower side with respect to the upper steel ball 7. These upper steel ball 7 and lower steel balls 9 are held by a retainer 11.

In the lower rail 3, a stopper 13 on which the retainer 11 can abut is formed. The stopper 13 restricts a moving range of the retainer (the upper steel ball 7 and the lower steel balls 9). The stopper 13 is formed of a hole 13a and a stopper main body 13b. The stopper main body 13b is bent from a lower edge portion of the hole 13a and projects in a direction of intersecting with the sliding direction of the upper rail 5 to ensure restricting the move of the retainer 11.

Next, the following describes attaching of the seat track with the above-described configuration. Before attaching, the stopper main body 13b of the stopper 13 is not bent from the lower edge portion of the hole 13a. First, the upper rail 5 is inserted from an end surface of the lower rail 3 that provides an opening surface.

Next, the retainer 11 in which the upper steel ball 7 and the lower steel balls 9 are set is press-fitted between the lower rail 3 and the upper rail 5. After the retainer 11 is press-fitted to a predetermined position, the stopper main body 13b is bent to cause the stopper main body 13b to function as the stopper 13 (for example, see JP-A-2010-089689).

SUMMARY

A seat track includes: a first rail disposed on any one of a floor and a seat; a second rail disposed on another of the floor and the seat, the second rail engaging with the first rail; at least two steel balls disposed between the first rail and the second rail, the steel balls relative-slidably supporting the second rail with respect to the first rail; a retainer that holds the steel balls such that the steel balls are disposed along a relative sliding direction of the second rail; and a stopper disposed in the first rail, the stopper being configured to restrict a move of the retainer. The stopper includes: a hole formed in the first rail; and a stopper main body that projects in a direction of intersecting with the relative sliding direction of the second rail from an edge portion of the hole, the stopper main body being configured to restrict the move of the retainer, a distance between centers of the two steel balls disposed at both ends in the relative sliding direction of the second rail among the steel balls is L1, a distance between inner walls of the hole in the relative sliding direction of the second rail is L2, and L1≥L2.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in a seat track (seat slide) with the configuration illustrated in FIG. 8, there possibly is a case in which an upper steel ball 7 falls into a hole 13a of a stopper 13 when a retainer 11 is press-fitted between a lower rail 3 and an upper rail 5 during an attachment. Recently, there has been a demand to downsize the seat track. In view of this, there is proposed a decreased cross-sectional shape of the seat track by decreasing a diameter of the steel ball, especially, the upper steel ball 7.

In the case where the diameter of the upper steel ball 7 is large, even if two of both the upper steel balls 7 fall into the hole 13a of the stopper 13, a falling amount is small (an extent of being caught). An assembly person pushing in the retainer 11 causes the upper steel ball 7 to move over the hole 13a of the stopper 13. However, in the case where the diameter of the upper steel ball 7 is made small, the falling amount of the upper steel ball 7 into the hole 13a is large. Therefore, there is a possibility that the retainer 11 cannot be pushed in with a force of the assembly person.

One of the purposes of this disclosure is to provide a seat track that ensures restraining a steel ball from excessively falling into a hole of a stopper.

A seat track according to an aspect of the present disclosure includes: a first rail disposed on any one of a floor and a seat; a second rail disposed on another of the floor and the seat, the second rail engaging with the first rail; at least two steel balls disposed between the first rail and the second rail, the steel balls relative-slidably supporting the second rail with respect to the first rail; a retainer that holds the steel balls such that the steel balls are disposed along a relative sliding direction of the second rail; and a stopper disposed in the first rail, the stopper being configured to restrict a move of the retainer. The stopper includes: a hole formed in the first rail; and a stopper main body that projects in a direction of intersecting with the relative sliding direction of the second rail from an edge portion of the hole, the stopper main body being configured to restrict the move of the retainer, a distance between centers of the two steel balls disposed at both ends in the relative sliding direction of the second rail among the steel balls is L1, a distance between inner walls of the hole in the relative sliding direction of the second rail is L2, and L1≥L2.

Other features of this disclosure will be more apparent from the following Description of Embodiments and the accompanying drawings.

With the seat track reflecting one aspect of this disclosure, when the distance between the centers of the two steel balls disposed at both the ends in the relative sliding direction of the second rail among the steel balls is L1 and the distance between the inner walls of the hole in the relative sliding direction of the second rail is L2, L1≥L2. This eliminates all the steel balls to simultaneously fall into the hole of the stopper. Accordingly, excessive falling of the steel balls into the hole of the stopper can be avoided.

Other effects related to the technique of this disclosure will be more apparent from the following embodiments and the accompanying drawings.

(Overall Configuration)

Figure 1:
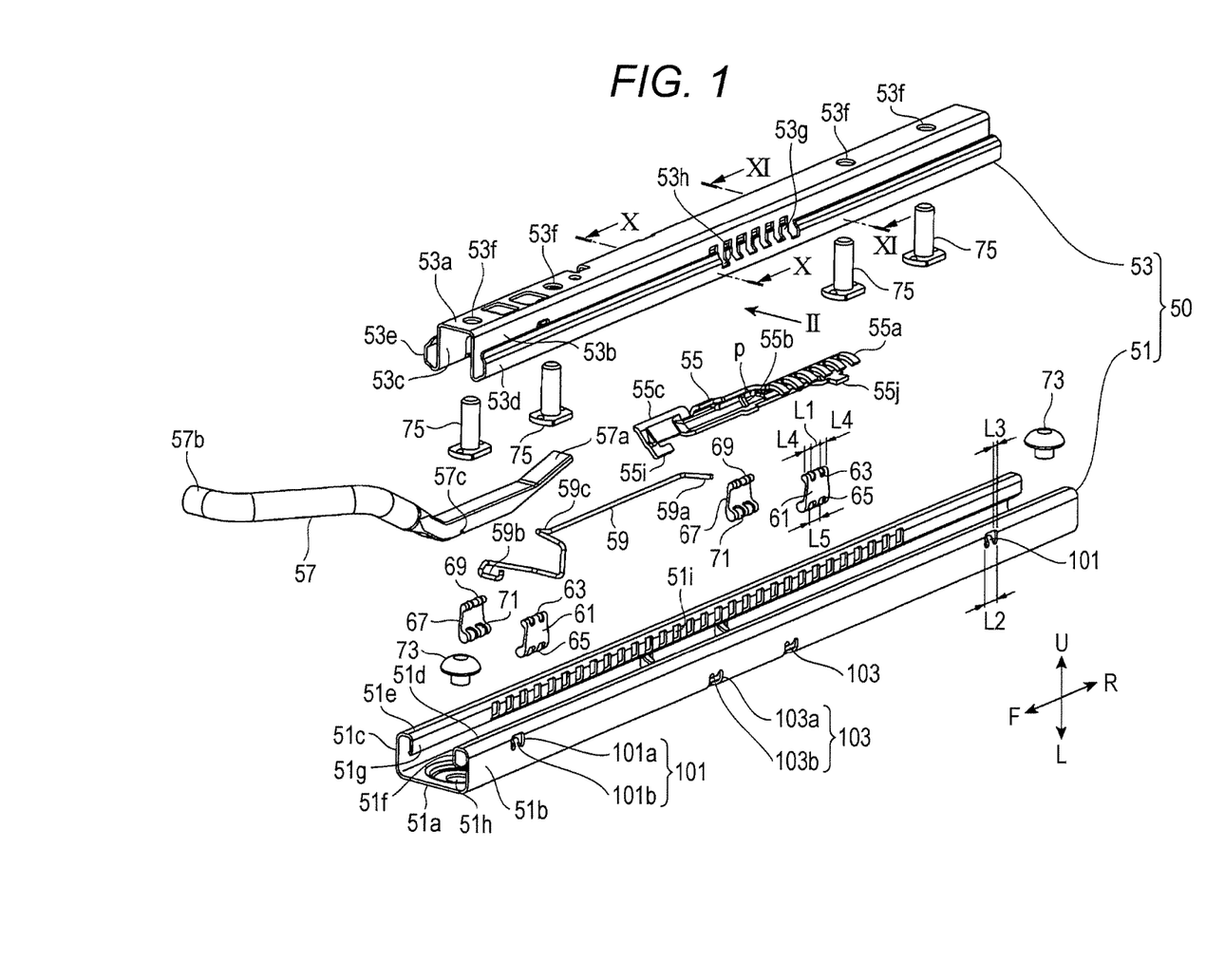
FIG. 1 is an exploded perspective view when a seat track according to an embodiment is viewed from an above.
Figure 2:
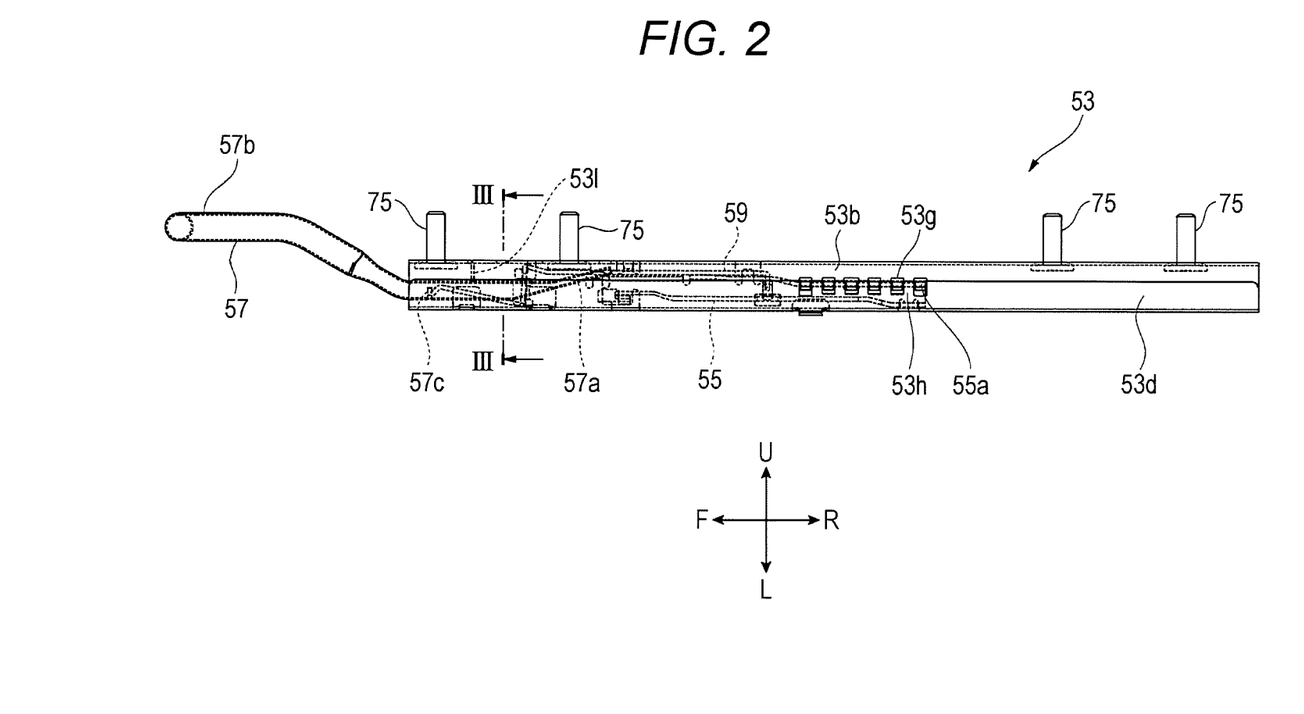
FIG. 2 is a front view of an upper rail viewed from an arrow II in FIG. 1 when the seat track illustrated in FIG. 1 is assembled.
Figure 3:
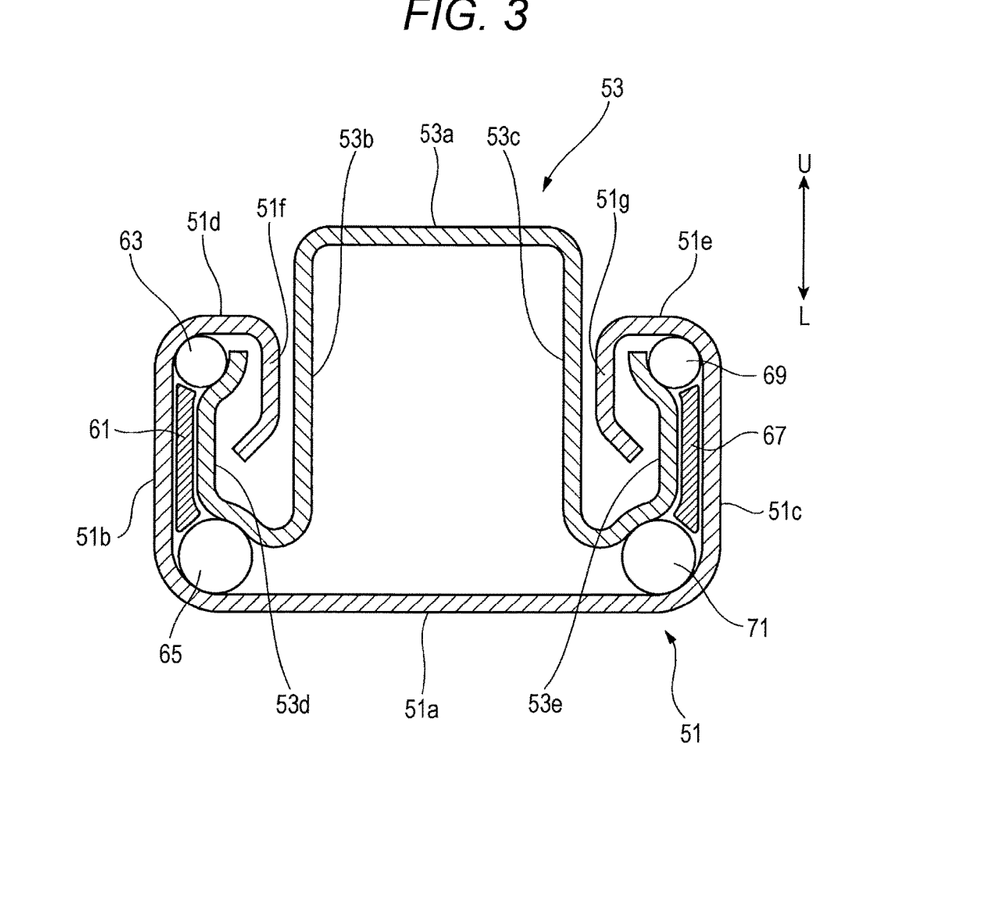
FIG. 3 is an end view of a portion taken along taken-along-line of the upper rail illustrated in FIG. 2.

The following describes an overall configuration of a seat track according to an embodiment with reference to FIGS. 1 to 3. FIG. 1 is an exploded perspective view when the seat track according to the embodiment is viewed from an above. FIG. 2 is a front view of an upper rail viewed from an arrow II in FIG. 1 when the seat track illustrated in FIG. 1 is assembled. FIG. 3 is an end view of a portion taken along taken-along-line III-III of the upper rail illustrated in FIG. 2.

A seat rail 50 includes a lower rail 51 disposed on a floor side and an upper rail 53. The upper rail 53 is disposed on a seat side to slidably engage with the lower rail 51.

The upper rail 53 includes a lock lever 55. The lock lever 55 is movable between a lock position, an unlock position, and a full-open position. At the lock position, the lock lever 55 restricts a slide operation of the upper rail 53 with respect to the lower rail 51. At the unlock position, the lock lever 55 allows the slide operation of the upper rail 53 with respect to the lower rail 51. At the full-open position, the lock lever 55 is operated more than the unlock position. The lock position, the unlock position, and the full-open position will be described later.

An operating member 57 switches the position of this lock lever 55 to any one of the lock position, the unlock position, and the full-open position.

The upper rail 53 includes a biasing member 59. The biasing member 59 has a wire shape with a longitudinal direction in a sliding direction of the upper rail 53. The biasing member 59 biases the lock lever 55 to the lock position direction.

A side where the operating member 57 is disposed is a front side of the seat rail 50 according to the embodiment.

FIGS. 1 to 3 and FIGS. 4 to 7, which will be described later, an arrow F direction indicates a front direction, an arrow R direction indicates a rear direction, an arrow U direction indicates an upper direction, and an arrow L direction indicates a lower direction.

(Lower Rail and Upper Rail)

FIGS. 1 to 3 describe the lower rail 51 and the upper rail 53.

As illustrated in FIG. 2 and the cross-sectional view in FIG. 3, the lower rail 51 includes a base bottom portion 51a, a first sidewall 51b, a second sidewall 51c, a first top surface portion 51d, a second top surface portion 51e, a first hanging portion 51f, and a second hanging portion 51g. The base bottom portion 51a is disposed approximately horizontal to a floor. The first sidewall 51b is bent from one end of the base bottom portion 51a and extends upward. The second sidewall 51c is bent from the other end of the base bottom portion 51a and extends upward. The first top surface portion 51d is bent from an end on an upper side of the first sidewall 51b and extends to the second sidewall 51c approximately parallel to the base bottom portion 51a. The second top surface portion 51e is bent from an end on an upper side of the second sidewall 51c and extends to the first sidewall 51b approximately parallel to the base bottom portion 51a. The first hanging portion 51f is bent from another end of the first top surface portion 51d to the base bottom portion 51a. A length of the first hanging portion 51f is shorter than the first sidewall 51b. The second hanging portion 51g is bent from the other end of the second top surface portion 51e in the base bottom portion 51a direction and is opposed to the first hanging portion 51f via a space. A length of the second hanging portion 51g is approximately identical to the first hanging portion 51f.

The upper rail 53 includes a top surface portion 53a, a first sidewall 53b, a second sidewall 53c, a first spring-up portion 53d, and a second spring-up portion 53e. The top surface portion 53a is disposed approximately parallel to the base bottom portion 51a of the lower rail 51. The first sidewall 53b is bent from one end of the top surface portion 53a and extends to an inside of the lower rail 51 via a space between the first hanging portion 51f and the second hanging portion 51g of the lower rail 51. The second sidewall 53c is bent from the other end of the top surface portion 53a and extends to the inside of the lower rail 51 via the space between the first hanging portion 51f and the second hanging portion 51g of the lower rail 51. The first spring-up portion 53d extends from a lower end of the first sidewall 53b to a space formed by the first sidewall 51b, the first top surface portion 51d, and the first hanging portion 51f of the lower rail 51. The second spring-up portion 53e extends from a lower end of the second sidewall 53c to a space formed by the second sidewall 51c, the second top surface portion 51e, and the second hanging portion 51g of the lower rail 51.

The first sidewall 51b, the first top surface portion 51d, and the first hanging portion 51f of the lower rail 51 and the second sidewall 51c, the second top surface portion 51e, and the second hanging portion 51g of the lower rail 51 function as a pair of lower flange portions extending from both sides of the base bottom portion 51a.

The first sidewall 53b and the second sidewall 53c of the upper rail 53 function as base portions disposed between the pair of lower flange portions. The first spring-up portion 53d and the second spring-up portion 53e of the upper rail 53 extend from the base portion and function as a pair of upper flanges engageable with the lower flange portions.

The seat track according to this embodiment includes at least two steel balls. These steel balls are disposed between the lower rail 51 and the upper rail 53 and relative-slidably support the upper rail 53 with respect to the lower rail 51. Furthermore, the seat track according to this embodiment includes the retainer. This retainer holds the steel balls such that the steel balls are disposed along the relative-sliding direction of the upper rail 53. The steel balls include at least two upper steel balls 63 (69).

Figure 5:
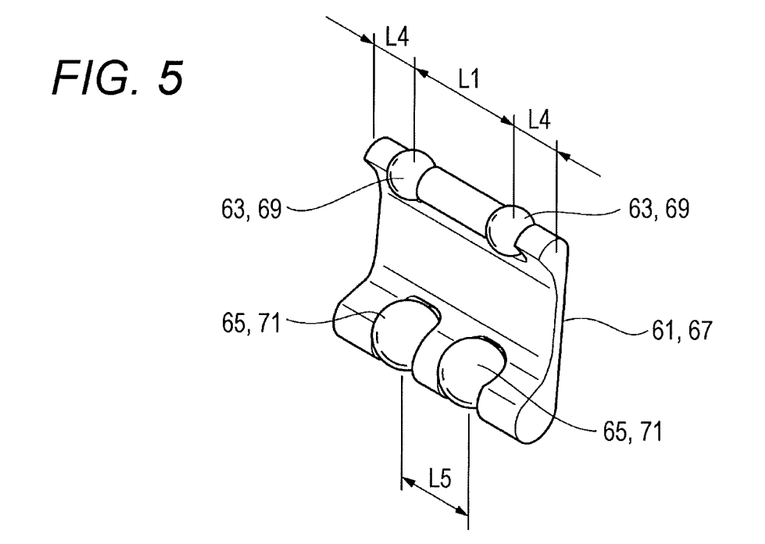
FIG. 5 is a perspective view of a retainer.
Figure 6:
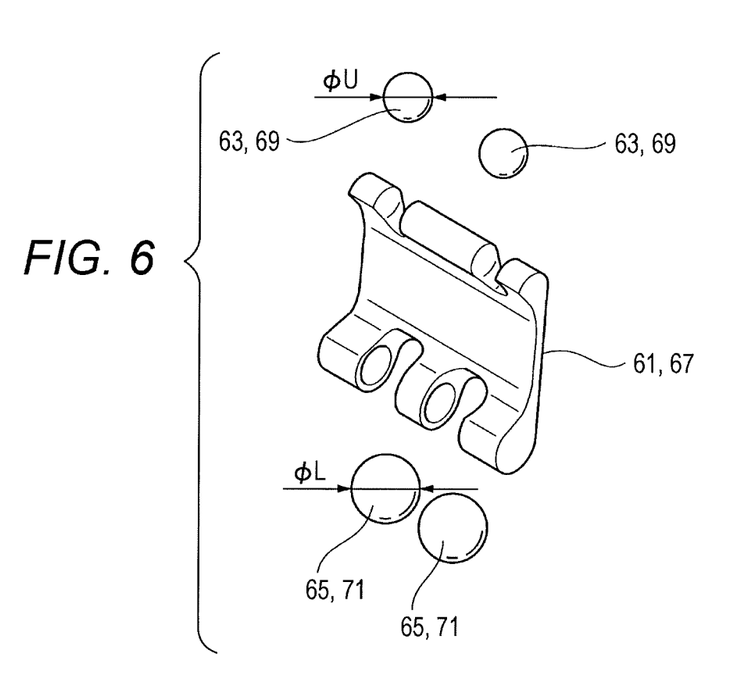
FIG. 6 is an exploded perspective view of the retainer illustrated in FIG. 5.
Figure 7:
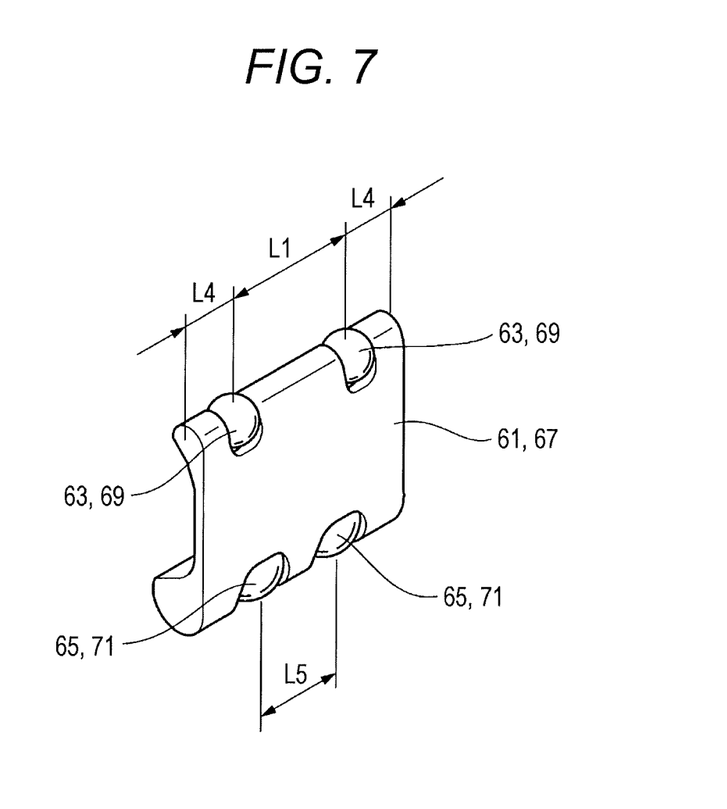
FIG. 7 is a perspective view viewing the retainer illustrated in FIG. 5 from another direction.

The following describes the retainer with reference to FIGS. 1, 3, 5, 6, and 7. FIG. 5 is a perspective view of the retainer. FIG. 6 is an exploded perspective view of the retainer illustrated in FIG. 5. FIG. 7 is a perspective view viewing the retainer illustrated in FIG. 5 from another direction.

As illustrated in these drawings, two retainers 61 are disposed in a front and a rear in the sliding direction of the upper rail 53 between the first sidewall 51b of the lower rail 51 and the first spring-up portion 53d of the upper rail 53. Furthermore, two retainers 67 are disposed in the front and the rear in the sliding direction of the upper rail 53 between the second sidewall 51c of the lower rail 51 and the second spring-up portion 53e of the upper rail 53.

Then, the two first upper steel balls 63 held by each of the retainers 61 are disposed in a space surrounded by the first sidewall 51b and the first top surface portion 51d of the lower rail 51 and the first spring-up portion 53d of the upper rail 53. Two first lower steel balls 65 held by each of the retainers 61 are disposed in a space surrounded by the base bottom portion 51a and the first sidewall 51b of the lower rail 51 and the first spring-up portion 53d of the upper rail 53.

The two second upper steel balls 69 held by each of the retainers 67 are disposed in a space surrounded by the second sidewall 51c and the second top surface portion 51e of the lower rail 51 and the second spring-up portion 53e of the upper rail 53. Two second lower steel balls 71 held by each of the retainers 67 are disposed in a space surrounded by the base bottom portion 51a and the second sidewall 51c of the lower rail 51 and the second spring-up portion 53e of the upper rail 53. This causes the upper rail 53 to slidingly move smoothly with respect to the lower rail 51.

In this embodiment, a diameter dimension of the first upper steel ball 63 and a diameter dimension of the second upper steel ball 69 are set to be identical to one another. Furthermore, a diameter dimension of the first lower steel ball 65 and a diameter dimension of the second lower steel ball 71 are set to be identical to one another.

A shape of the two retainers 61 and a shape of the two retainers 67 are also set to be identical to one another. Furthermore, as illustrated in FIG. 6, when the diameter dimension of the first upper steel ball 63 and the second upper steel ball 69 is ΦU and the diameter dimension of the first lower steel ball 65 and the second lower steel ball 71 is ΦL, ΦU<ΦL.

As illustrated in FIG. 1 (FIG. 2), the lower rail 51 includes stoppers that restrict a moving range of the steel balls (the first upper steel balls 63, the second upper steel balls 69, the first lower steel balls 65, and the second lower steel balls 71) by the retainers 61 and the retainers 67 abutting on the stoppers. That is, the stopper is configured to restrict the move of the retainer 61 (67) holding the steel balls.

The stoppers in this embodiment include upper stoppers 101 and lower stoppers 103. The upper stoppers 101 are disposed in upper portions and on open surface sides on both the ends of the first sidewall 51b and the second sidewall 51c of the lower rail 51. The lower stoppers 103 are disposed in lower portions and in intermediate portions in the longitudinal direction of the first sidewall 51b and the second sidewall 51c of the lower rail 51.

The upper stopper 101 includes a hole 101a and a stopper main body 101b. The hole 101a is formed such that the first upper steel ball 63 and the second upper steel ball 69 can pass through the hole 101a in the sliding direction of the upper rail 53. The stopper main body 101b projects in a direction of intersecting with the sliding direction of the upper rail 53 from a lower edge portion of the hole 101a. The stopper main body 101b is formed such that the retainer 61 and the retainer 67 can abut on the stopper main body 101b.

The lower stopper 103 includes a hole 103a and a stopper main body 103b. The stopper main body 103b projects in the direction of intersecting with the sliding direction of the upper rail 53 from an upper edge portion of the hole 103a. The stopper main body 103b is formed such that the retainer 61 and the retainer 67 can abut on the stopper main body 103b.

The seat track according to this embodiment has the following dimensional relationships.

(1) As illustrated in FIGS. 5 and 7, a distance between centers of the two upper steel balls 63 (69) held by the retainer 61 (67) is L1. As illustrated in FIG. 1, a distance between inner walls of the hole 101a of the upper stopper 101 in the sliding direction of the upper rail 53 is L2. In this case, L1≥L2.

(2) As illustrated in FIG. 1, a distance between the inner wall of the hole 101a of the upper stopper 101 and an outer wall of the stopper main body 101b opposing this inner wall in the sliding direction of the upper rail 53 is L3. As illustrated in FIGS. 5 and 7, a distance between the center of the upper steel ball 63 (69) and an outer wall of the retainer 61 (67) in the sliding direction of the upper rail 53 is L4. In this case, L3<L4.

(3) A distance between centers of the two first lower steel balls 65 (the two second lower steel balls 71) held by the retainer 61 (67) is L5. In this case, L1>L5.

As illustrated in FIG. 1, the lower rail 51 is mounted to the floor side with pins 73 inserted through the base bottom portion 51a of the lower rail 51.

The top surface portion 53a of the upper rail 53 has four holes 53f. With pins 75 inserted through these holes 53f, the upper rail 53 is mounted to the seat side.

(Lock Mechanism)

Figure 4:
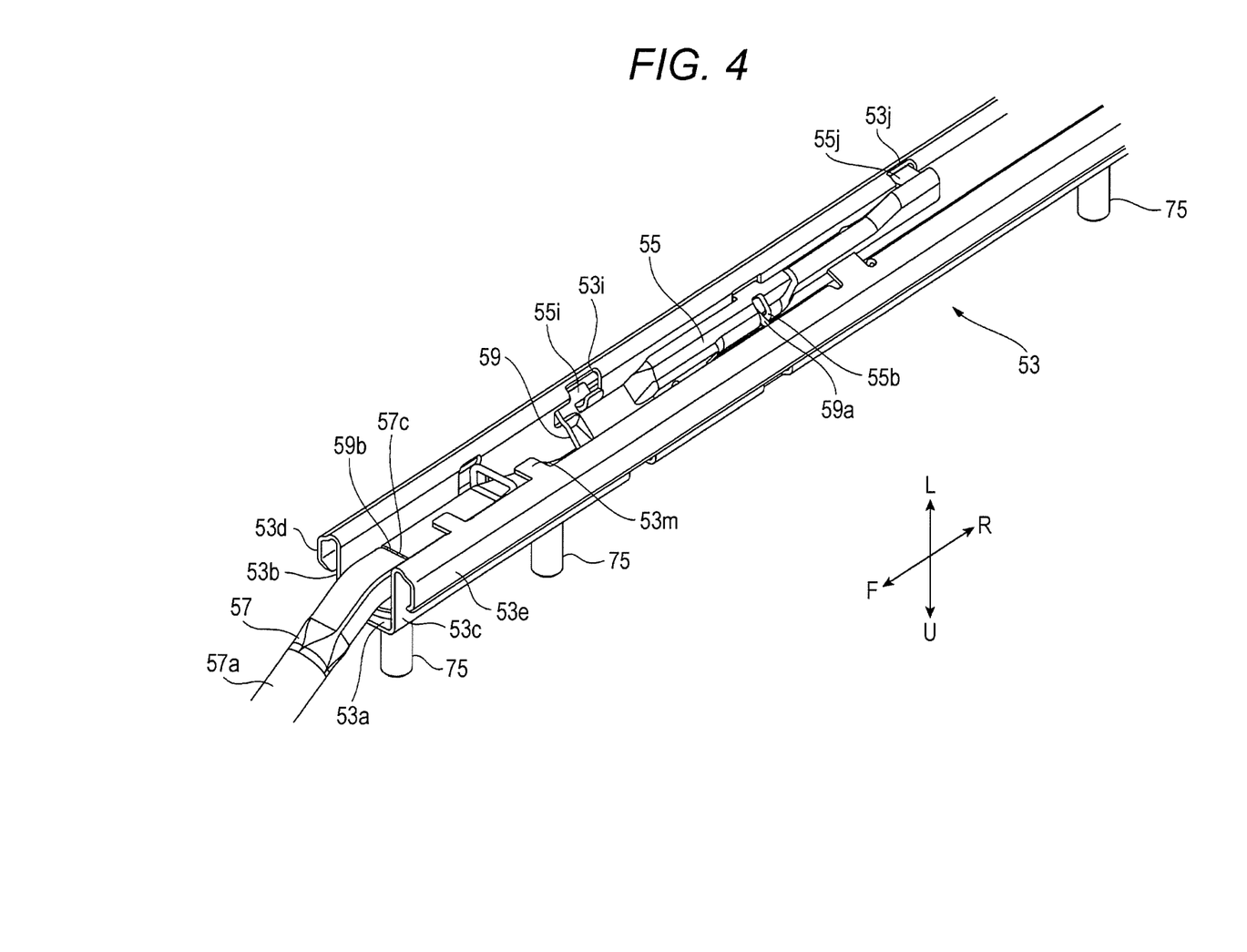
FIG. 4 is a perspective view of the upper rail viewed from a lower side when the seat track illustrated in FIG. 1 is attached.

The following describes a lock mechanism with reference to FIGS. 1 to 4. FIG. 4 is a perspective view of the upper rail when the seat track is attached.

As illustrated in FIGS. 1, 2 and FIG. 4, in a space surround by the top surface portion 53a, the first sidewall 53b, and the second sidewall 53c of the upper rail 53, a rear portion of the operating member 57 and the lock lever 55 are disposed in an order from the front side of the seat track. Furthermore, in this space, the biasing member 59 locked to the operating member 57 and the lock lever 55 is also disposed.

As illustrated in FIG. 1, the second hanging portion 51g of the lower rail 51 has a plurality of lock holes (lock portions of the lower rail 51) 51i along a sliding direction (longitudinal direction) of the upper rail 53. In this embodiment, the first hanging portion 51f also includes lock holes 51i (not illustrated) opposed to the plurality of lock holes 51i on the second hanging portion 51g.

As illustrated in FIG. 2, the upper rail 53 has first cutouts 53g at the center in the longitudinal direction of the first sidewall 53b. Further, as illustrated in FIG. 1, the upper rail 53 has second cutouts 53h, which are opposed to the first cutouts 53g, on the first spring-up portion 53d.

As illustrated in FIG. 4, the upper rail 53 has a first locking hole 53i and the second locking hole 53j on the first sidewall 53b in an order from the front side.

Meanwhile, as illustrated in FIGS. 1 and 4, the lock lever 55 includes a projected first locking portion 55i fitted to the first locking hole 53i and a projected second locking portion 55*j* fitted to the second locking hole 53*j*. The lock lever 55 rotationally moves between the lock position, the unlock position, and the full-open position using the first locking hole 53*i* and the second locking hole 53*j* as rotation fulcrums (using the sliding direction of the upper rail 53 as an axis).

As illustrated in FIGS. 1 and 2, a plurality of (six in this embodiment) lock claws (locking portions) 55*a* are formed at the rear of the lock lever 55. The rotation of the lock lever 55 inserts these lock claws 55*a* through the first cutouts 53*g* on the upper rail 53, and thus the lock claws 55*a* can be engaged with and disengaged from the lock holes 51*i* on the first hanging portion 51*f* of the lower rail 51. In this embodiment, distal end sides of the lock claws 55*a* on the lock lever 55 engaged with the lock holes 51*i* on the first hanging portion 51*f* of the lower rail 51 are inserted through the second cutouts 53*h* on the upper rail 53.

Engaging the lock claws 55*a* on the lock lever 55 disposed at the upper rail 53 with the lock holes 51*i* on the lower rail 51 restricts the slide operation of the upper rail 53 with respect to the lower rail 51.

(Operating Member, Biasing Member)

The following describes the operation member 57 and the biasing member 59 with reference to FIGS. 1, 2, and 4.

The operating member 57 is disposed forward with respect to the lock lever 55. The operating member 57 includes a pressing portion 57*a* at the rear. The pressing portion 57*a* is configured to press a pressed portion 55*c* with a cylindrical surface, which is disposed at the front portion of the lock lever 55, from upward. The operating member 57 includes an operating portion 57*b* bent and along a front portion of a seat cushion at the front portion.

A top surface at an intermediate portion of the operating member 57 abuts on a fulcrum projection 53*l*, which is formed on an inner wall side of the top surface portion 53*a* of the upper rail 53. The operating member 57 is vertically rotatable with an abutting point by this abutment as a rotation fulcrum. Furthermore, a stopper projection 53*m* is formed at a position rearward with respect to the fulcrum projection 53*l* on the second sidewall 53*c* of the upper rail 53. A lower surface of the operating member 57 can abut on the stopper projection 53*m*.

The biasing member 59 is a wire-processed spring that can be obtained by bending a wire-shaped material (wire material) into various directions.

The biasing member 59 is disposed in a space surrounded by the top surface portion 53*a* on the upper rail 53 and the pair of sidewalls (the first sidewall 53*b* and the second sidewall 53*c*) along the sliding direction of the upper rail 53.

The biasing member 59 has an intersecting portion 59*c* locked to the upper rail 53 on the intermediate portion. Locking this intersecting portion 59*c* to the upper rail 53 inhibits the relative sliding of the biasing member 59 and the upper rail 53 in the sliding direction of the upper rail 53.

The biasing member 59 includes a rear-portion bent portion (arm) 59*a* on the rear portion. The rear-portion bent portion 59*a* is bent in the direction of intersecting with the sliding direction of the upper rail 53. Locking the rear-portion bent portion 59*a* to a hole 55*b* formed at the intermediate portion of the lock lever 55 biases the lock lever 55 to a lock position direction. This rear-portion bent portion 59*a* also functions as a biasing portion to bias the lock lever 55 to the lock position direction using an elastic restoration force when the rear-portion bent portion 59*a* is twisted.

Next, the biasing member 59 includes a restricting portion (fitting portion) 59*b* on the front end side. The restricting portion 59*b* is bent in the direction of intersecting with the sliding direction of the upper rail 53. The restricting portion 59*b* is locked to a groove 57*c* on the operating member 57. The groove 57*c* is formed at a lower portion of the operating member 57 on the front side with respect to the rotation fulcrum in the direction of intersecting with the sliding direction of the upper rail. Accordingly, the restricting portion 59*b* restricts the movement of the operating member 57 in the sliding direction of the upper rail 53 and biases the operating member 57.

The following describes an actuation of a seat track with the above-described configuration.

First, in the case where the operating member 57 is not operated, the biasing force from the biasing member 59 locates the lock lever 55 disposed at the upper rail 53 at the lock position. That is, the lock claw 55*a* is inserted through the first cutout 53*g* on the upper rail 53 and engaged with the lock hole 51*i* on the lower rail 51. The lock claw 55*a* is further engaged with the second cutout 53*h* of the upper rail 53. This sets the seat track to be in the lock state in which the slide operation of the upper rail 53 with respect to the lower rail 51 is restricted.

Next, against the biasing force from the biasing member 59, pulling the operating portion 57*b* of the operating member 57 upward rotates the lock lever 55 disposed at the upper rail 53 up to the unlock position or the full-open position. This sets the seat track in the unlock state or the full-open state. The unlock state and the full-open state release the engagement between the lock claw 55*a* and the lock hole 51*i* on the lower rail 51 and allows the slide operation of the upper rail 53 with respect to the lower rail 51.

Sliding the upper rail 53 up to a desired position with respect to the lower rail 51 and the operating force to the operating member 57 is released, the elastic restoration force (biasing force) of the biasing member 59 returns the lock lever 55 at the unlock position or the full-open position to the lock position. The seat track recovers to the lock state in which the slide operation of the upper rail 53 with respect to the lower rail 51 is restricted.

Next, the following describes attaching of the seat track with the above-described configuration.

Before attaching, the stopper main bodies 101*b* of the upper stoppers 101 on the lower rail 51 are not bent from the lower edge portions of the holes 101*a*. On the other hand, the stopper main bodies 103*b* of the lower stoppers 103 on the lower rail 51 are bent.

First, the upper rail 53 is inserted from the end surface, which is the open surface, of the lower rail 51.

Next, the retainers 61 in which the first upper steel balls 63 and the first lower steel balls 65 are set and the retainers 67 in which the second upper steel balls 69 and the second lower steel balls 71 are set are press-fitted between the lower rail 51 and the upper rail 53.

After the retainers 61 and 67 are press-fitted to predetermined positions, the stopper main bodies 101*b* are bent to cause the stopper main bodies 101*b* to function as the upper stoppers 101.

Accordingly, between the upper stoppers 101 and the lower stoppers 103, the retainers 61 in which the first upper steel balls 63 and the first lower steel balls 65 are set and the retainers 67 in which the second upper steel balls 69 and the second lower steel balls 71 are set are movable.

The configuration ensures obtaining the following effects.

(1) The distance between the centers of the two first upper steel balls 63 (the two second upper steel balls 69) held by the retainer 61 (67) is L1. The distance between the inner walls of the hole 101*a* of the upper stopper 101 in the sliding direction of the upper rail 53 is L2. In this case, L1≥L2. In view of this, the two first upper steel balls 63 (the two second upper steel balls 69) no longer simultaneously fall into the hole 101a of the upper stopper 101 in assembly. That is, any one of the steel balls among the two first upper steel balls 63 (the two second upper steel balls 69) does not fall into the hole 101a. Accordingly, the steel balls excessively falling into the hole of the stopper can be restrained.

(2) The distance between the inner wall of the hole 101a of the upper stopper 101 and the outer wall of the stopper main body 101b opposing this inner wall in the sliding direction of the upper rail 53 is L3. The distance between the center of the first upper steel ball 63 (the second upper steel ball 69) and the outer wall of the retainer 61 (67) in the sliding direction of the upper rail 53 is L4. In this case, L3<L4. In view of this, when the retainer 61 (67) abuts on the stopper main body 101b of the upper stopper 101, the first upper steel ball 63 (the second upper steel ball 69) no longer falls into the hole 101a of the upper stopper 101.

(3) The distance between the centers of the two first lower steel balls 65 (the two second lower steel balls 71) held by the retainer 61 (67) is L5. In this case, L1>L5. That is, the distance between the centers of the two first lower steel balls 65 (the two second lower steel balls 71) is shortened.

Accordingly, when a force that separates from the lower rail 51 acts on the upper rail 53 due to a rear-end collision of a vehicle or the like, a load transmitted from the upper rail 53 to the lower rail 51 is transmitted dispersed to the two first lower steel balls 65 and the two second lower steel balls 71. In view of this, the upper rail 53 and the lower rail 51 are less likely to be deformed and damaged.

That is, in the case of the rear-end collision of the vehicle, the rear end of the upper rail tends to move downward. At this time, the two lower steel balls mounted to the rear side retainer resist against this downward move. In this resistance, among the two lower steel balls, the lower steel ball in the rear side mainly functions and the lower steel ball in the front side secondarily functions. Accordingly, the distance between the two lower steel balls (rear side and front side) being short is advantageous because the downward move restraint by the lower steel ball secondarily functions (the lower steel ball in the front side) occurs early.

The technique of this disclosure is not limited to the above-described embodiment. In this embodiment, the upper rail 53 disposed on the seat side is engaged with the lower rail 51 disposed on the floor side. That is, the lower rail 51 is the first rail and the upper rail 53 is the second rail that is engaged with the first rail. Instead of this, the lower rail disposed on the floor side may be engaged with the upper rail disposed on the seat side. That is, the upper rail 53 may be the lower rail and the lower rail 51 may be the upper rail. In this case, the upper rail is the first rail and the lower rail is the second rail that is engaged with the first rail.

In this embodiment, the description is made for a case where the number of the first upper steel balls 63 and the number of the second upper steel balls 69 are two. However, the number of the first upper steel balls 63 and the number of the second upper steel balls 69 may be three or more. In such case, L1 is a distance between the centers of the two upper steel balls disposed at both the ends in the sliding direction of the upper rail 53 among the upper steel balls. The two upper steel balls disposed at both the ends described here mean the steel balls at the foremost side and the rearmost side.

In this embodiment, the seat track includes at least the two upper steel balls 63 (69) and at least the two lower steel balls 65 (71). The technique of this disclosure is not limited to this, but the seat track, while including at least the two upper steel balls 63 (69) as the steel balls, does not necessarily include the lower steel ball. Alternatively, the seat track, while including at least the two lower steel balls 65 (71) as the steel balls, does not necessarily include the upper steel ball. In this case, an interval between the lower steel balls at both the ends in the relative sliding direction of the upper rail 53 (the steel balls at the foremost side and the rearmost side) among at least the two lower steel balls 65 (71) may be the above-described L1 (L1≥L2).

The embodiments of this disclosure may be the following first to third seat tracks.

The first seat track includes a first rail, a second rail, a steel ball, a retainer, and a stopper. The first rail is disposed on any one of sides of a floor and a seat. The second rail is disposed on another of the floor and the seat and engages with the first rail. The steel ball is disposed between the first rail and the second rail and relative-slidably supports the second rail with respect to the first rail. The retainer holds at least the two steel balls disposed along a relative sliding direction of the second rail. The stopper is disposed in the rail on the floor side and is configured to restrict a move of the retainer. The stopper is formed of a hole and a stopper main body. The hole is formed in the rail on the floor side. The stopper main body projects in a direction of intersecting with the relative sliding direction of the second rail from an edge portion of the hole. The stopper main body is configured to restrict the move of the retainer. When a distance between centers of the two steel balls disposed at both ends in the relative sliding direction of the second rail is L1 and a distance between inner walls of the hole in the relative sliding direction of the second rail is L2, L1≥L2.

The second seat track according to the first seat track is configured as follows. When a distance between the inner wall of the hole in the relative sliding direction of the second rail and an outer wall of the stopper main body opposing the inner wall is L3 and distances between the centers of the steel balls disposed at both the ends in the relative sliding direction of the second rail and outer wall of the retainer are L4, L3<L4.

The third seat track according to the first or the second seat track is configured as follows. The retainer holds two upper steel balls and two lower steel balls. The two upper steel balls are disposed along the relative sliding direction of the second rail. The two lower steel balls are disposed along the relative sliding direction of the second rail. The two lower steel balls are positioned in a lower side with respect to the upper steel balls. When a distance between centers of the upper steel balls is L1 and a distance between centers of the lower steel balls is L5, L1>L5.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A seat track comprising:
    a first rail disposed on any one of a floor and a seat;
    a second rail disposed on another of the floor and the seat, the second rail engaging with the first rail;

at least two upper steel balls disposed between the first rail and the second rail, the upper steel balls relative-slidably supporting the second rail with respect to the first rail;

a retainer that holds the upper steel balls such that the upper steel balls are disposed along a relative sliding direction of the second rail; and a stopper disposed in the first rail, the stopper being configured to restrict a move of the retainer, wherein the stopper includes:

a hole formed in the first rail; and a stopper main body that projects in a direction of intersecting with the relative sliding direction of the second rail from an edge portion of the hole, the stopper main body being configured to restrict the move of the retainer, a distance between centers of the two upper steel balls disposed at both ends of the retainer in the relative sliding direction of the second rail among the steel balls is L1, a distance between inner walls of the hole in the relative sliding direction of the second rail is L2,

L1≥L2, the seat track further includes two lower steel balls disposed along the relative sliding direction of the second rail, the two lower steel balls being positioned in a lower side with respect to the upper steel balls, the retainer holds the upper steel balls and the lower steel balls, a distance between centers of the lower steel balls is L5, and

L1>L5.

2. The seat track according to claim 1, wherein a distance between the inner wall of the hole and an outer wall of the stopper main body opposing the inner wall in the relative sliding direction of the second rail is L3, distances between the centers of the steel balls disposed at both the ends in the relative sliding direction of the second rail and outer walls of the retainer in the relative sliding direction of the second rail are L4, and

L3<L4.

3. The seat track according to claim 1, wherein when the upper steel ball has a diameter dimension of $\phi U$ and the lower steel ball has a diameter dimension of $\phi L$, $\phi U < \phi L$.

4. The seat track according to claim 1, wherein the stopper includes:

upper stoppers which are disposed in upper portions of a sidewall of the first rail and on open surface sides on both ends of the first rail; and lower stoppers which are disposed in lower portions of the sidewall of the first rail and in intermediate portions in the longitudinal direction of the first rail.

* * * * *